United States Patent
Pendyala et al.

(10) Patent No.: US 10,733,996 B2
(45) Date of Patent: Aug. 4, 2020

(54) USER AUTHENTICATION

(71) Applicant: QUALCOMM Incorporated, San Diego, CA (US)

(72) Inventors: Bhaskara Ramudu Pendyala, Rajahmundry (IN); Pavan Kumar Kadiyala, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 279 days.

(21) Appl. No.: 15/942,196

(22) Filed: Mar. 30, 2018

(65) Prior Publication Data
US 2019/0304472 A1 Oct. 3, 2019

(51) Int. Cl.
G10L 17/24 (2013.01)
G06K 9/00 (2006.01)
G06F 21/32 (2013.01)
G10L 17/26 (2013.01)

(52) U.S. Cl.
CPC .......... *G10L 17/24* (2013.01); *G06F 21/32* (2013.01); *G06K 9/00899* (2013.01); *G10L 17/26* (2013.01)

(58) Field of Classification Search
CPC ....... G10L 17/24; G10L 17/26; G10L 17/005; G10L 17/06; G06F 21/32; G06F 16/784; G06F 16/7834; G06K 9/00899; G06K 9/00926; G06K 9/00255; G06K 9/00288; G06K 9/00718
See application file for complete search history.

(56) References Cited

U.S. PATENT DOCUMENTS

| 9,317,736 B1* | 4/2016 | Siddiqui ................. G10L 17/22 |
| 9,390,726 B1* | 7/2016 | Smus ...................... G10L 15/22 |
| 9,641,585 B2* | 5/2017 | Kvaal .................... H04L 65/605 |
| 9,984,314 B2* | 5/2018 | Philipose ............. G06K 9/6285 |

(Continued)

FOREIGN PATENT DOCUMENTS

EP 3156978 A1 4/2017

OTHER PUBLICATIONS

Broun C.C., et al., "Distributed Speaker Recognition Using the ETSI Distributed Speech Recognition Standard", Motorola Limited, Feb. 2002, 6 pages.

(Continued)

Primary Examiner — Mohammad K Islam
(74) Attorney, Agent, or Firm — Moore Intellectual Property Law, PLLC

(57) ABSTRACT

A device includes a processor configured to extract parameters from an audio signal. The processor is configured to perform liveness verification by determining, based on first parameters and a liveness data model, whether the audio signal corresponds to a first audio type indicating spoken speech, to perform user verification by determining, based on second parameters and a user speech model, whether the audio signal corresponds to speech of a particular user, and to perform keyword verification by determining, based on third parameters and a keyword data model, whether the audio signal corresponds to a particular keyword. The processor is configured to generate an output indicating that user authentication is successful in response to determining that the audio signal corresponds to speech of the particular user, to the particular keyword, and to the first audio type.

29 Claims, 5 Drawing Sheets

(56) References Cited

U.S. PATENT DOCUMENTS

| | | | |
|---|---|---|---|
| 10,210,685 B2* | 2/2019 | Borgmeyer | G06K 19/0723 |
| 10,305,895 B2* | 5/2019 | Barry | G06K 9/2036 |
| 10,467,509 B2* | 11/2019 | Albadawi | G06F 21/35 |
| 2009/0319270 A1* | 12/2009 | Gross | G10L 15/22 |
| | | | 704/246 |
| 2010/0131273 A1 | 5/2010 | Aley-Raz et al. | |
| 2011/0246198 A1* | 10/2011 | Asenjo | B66B 13/26 |
| | | | 704/247 |
| 2012/0253809 A1 | 10/2012 | Thomas et al. | |
| 2012/0290297 A1 | 11/2012 | Baughman et al. | |
| 2013/0227678 A1* | 8/2013 | Kang | G06F 21/32 |
| | | | 726/19 |
| 2014/0237576 A1* | 8/2014 | Zhang | G06F 21/32 |
| | | | 726/7 |
| 2014/0330568 A1* | 11/2014 | Lewis | G10L 15/22 |
| | | | 704/273 |
| 2015/0046162 A1 | 2/2015 | Aley-Raz et al. | |
| 2015/0112682 A1* | 4/2015 | Rodriguez | G10L 17/06 |
| | | | 704/249 |
| 2015/0134330 A1* | 5/2015 | Baldwin | G06F 21/32 |
| | | | 704/232 |
| 2015/0301796 A1 | 10/2015 | Visser et al. | |
| 2015/0332665 A1* | 11/2015 | Mishra | G10L 15/1815 |
| | | | 704/257 |
| 2016/0171806 A1 | 6/2016 | Van Dyken et al. | |
| 2016/0217321 A1* | 7/2016 | Gottlieb | G06K 9/00308 |
| 2016/0378964 A1 | 12/2016 | Singh et al. | |
| 2017/0068805 A1* | 3/2017 | Chandrasekharan | G06F 3/167 |
| 2017/0110121 A1* | 4/2017 | Warford | H04M 3/5175 |
| 2017/0220786 A1 | 8/2017 | Guo et al. | |
| 2017/0279815 A1* | 9/2017 | Chung | H04L 63/123 |
| 2017/0323644 A1* | 11/2017 | Kawato | G10L 17/00 |
| 2018/0107866 A1* | 4/2018 | Li | G06K 9/00288 |
| 2018/0121161 A1* | 5/2018 | Ueno | G06F 3/0412 |
| 2018/0174600 A1* | 6/2018 | Chaudhuri | G06K 9/00744 |
| 2018/0187969 A1* | 7/2018 | Kim | F25D 29/00 |
| 2018/0232201 A1* | 8/2018 | Holtmann | G06F 1/3231 |
| 2018/0308487 A1* | 10/2018 | Goel | G10L 15/1815 |
| 2018/0336716 A1* | 11/2018 | Ramprashad | G06F 3/012 |
| 2019/0042871 A1* | 2/2019 | Pogorelik | H04N 5/23219 |
| 2019/0098003 A1* | 3/2019 | Ota | G10L 17/06 |
| 2019/0197755 A1* | 6/2019 | Vats | G06T 13/40 |
| 2019/0246075 A1* | 8/2019 | Khadloya | G10L 25/51 |
| 2019/0294629 A1* | 9/2019 | Wexler | G06F 16/50 |
| 2019/0295554 A1* | 9/2019 | Lesso | G10L 17/22 |
| 2019/0311722 A1* | 10/2019 | Caldwell | G10L 17/02 |
| 2019/0313014 A1* | 10/2019 | Welbourne | G06K 9/00221 |
| 2019/0356588 A1* | 11/2019 | Shahraray | G06N 3/08 |

OTHER PUBLICATIONS

Jelil S., et al., "Spoof Detection Using Source, Instantaneous Frequency and Cepstral Features", Indian Institute of Technology, Aug. 20-24, 2017, pp. 22-26.

Witkowski M., et al., "Audio Replay Attack Detection Using High-Frequency Features", AGH University of Science Technology, Aug. 20-24, 2017, pp. 27-31.

* cited by examiner

USER AUTHENTICATION

I. FIELD

The present disclosure is generally related to user authentication.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities that support various features, such as voice activation.

With the widespread use of mobile phones and other voice-activated devices, use of voice commands is becoming more common place. Voice-based user authentication is vulnerable to "spoofing." To cause a false authentication by spoofing, an unauthorized user may record the voice of an authorized user and playback the recorded voice to a voice-activated device. With the increasing use of devices to access sensitive information, the risk of unauthorized access by spoofing is a challenge to viability of voice-based user authentication.

III. SUMMARY

In a particular aspect, a device includes a processor. The processor is configured to extract a set of parameters from an audio signal. The processor is also configured to perform liveness verification by determining, based on a first plurality of parameters and a liveness data model, whether the audio signal corresponds to a first audio type indicating spoken speech or a second audio type indicating playback of recorded speech. The processor is further configured to perform user verification by determining, based on a second plurality of parameters and a user speech model, whether the audio signal corresponds to speech of a particular user associated with the user speech model. The processor is also configured to perform keyword verification by determining, based on a third plurality of parameters and a keyword data model, whether the audio signal corresponds to a particular keyword. The set of parameters includes the first plurality of parameters, the second plurality of parameters, and the third plurality of parameters. The processor is further configured to generate an output indicating that user authentication is successful in response to determining that the audio signal corresponds to the speech of the particular user, to the particular keyword, and to the first audio type.

In another particular aspect, a method includes receiving an audio signal at a device. The method also includes extracting, at the device, a set of parameters from the audio signal. The method further includes performing, at the device, liveness verification by determining, based on a first plurality of parameters and a liveness data model, whether the audio signal corresponds to a first audio type indicating spoken speech or a second audio type indicating playback of recorded speech. The method also includes performing, at the device, user verification by determining, based on a second plurality of parameters and a user speech model, whether the audio signal corresponds to speech of a particular user associated with the user speech model. The method further includes performing, at the device, keyword verification by determining, based on a third plurality of parameters and a keyword data model, whether the audio signal corresponds to a particular keyword. The set of parameters includes the first plurality of parameters, the second plurality of parameters, and the third plurality of parameters. The method also includes generating, at the device, an output indicating that user authentication is successful based on determining that the audio signal corresponds to the speech of the particular user, to the particular keyword, and to the first audio type.

In another particular aspect, a computer-readable storage device stores instructions that, when executed by a processor, cause the processor to perform operations including extracting a set of parameters from an audio signal. The operations also include performing liveness verification by determining, based on a first plurality of parameters and a liveness data model, whether the audio signal corresponds to a first audio type indicating spoken speech or a second audio type indicating playback of recorded speech. The operations further include performing user verification by determining, based on a second plurality of parameters and a user speech model, whether the audio signal corresponds to speech of a particular user associated with the user speech model. The operations also include performing keyword verification by determining, based on a third plurality of parameters and a keyword data model, whether the audio signal corresponds to a particular keyword. The set of parameters includes the first plurality of parameters, the second plurality of parameters, and the third plurality of parameters. The operations further include generating an output indicating that user authentication is successful in response to determining that the audio signal corresponds to the speech of the particular user, to the particular keyword, and to the first audio type.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
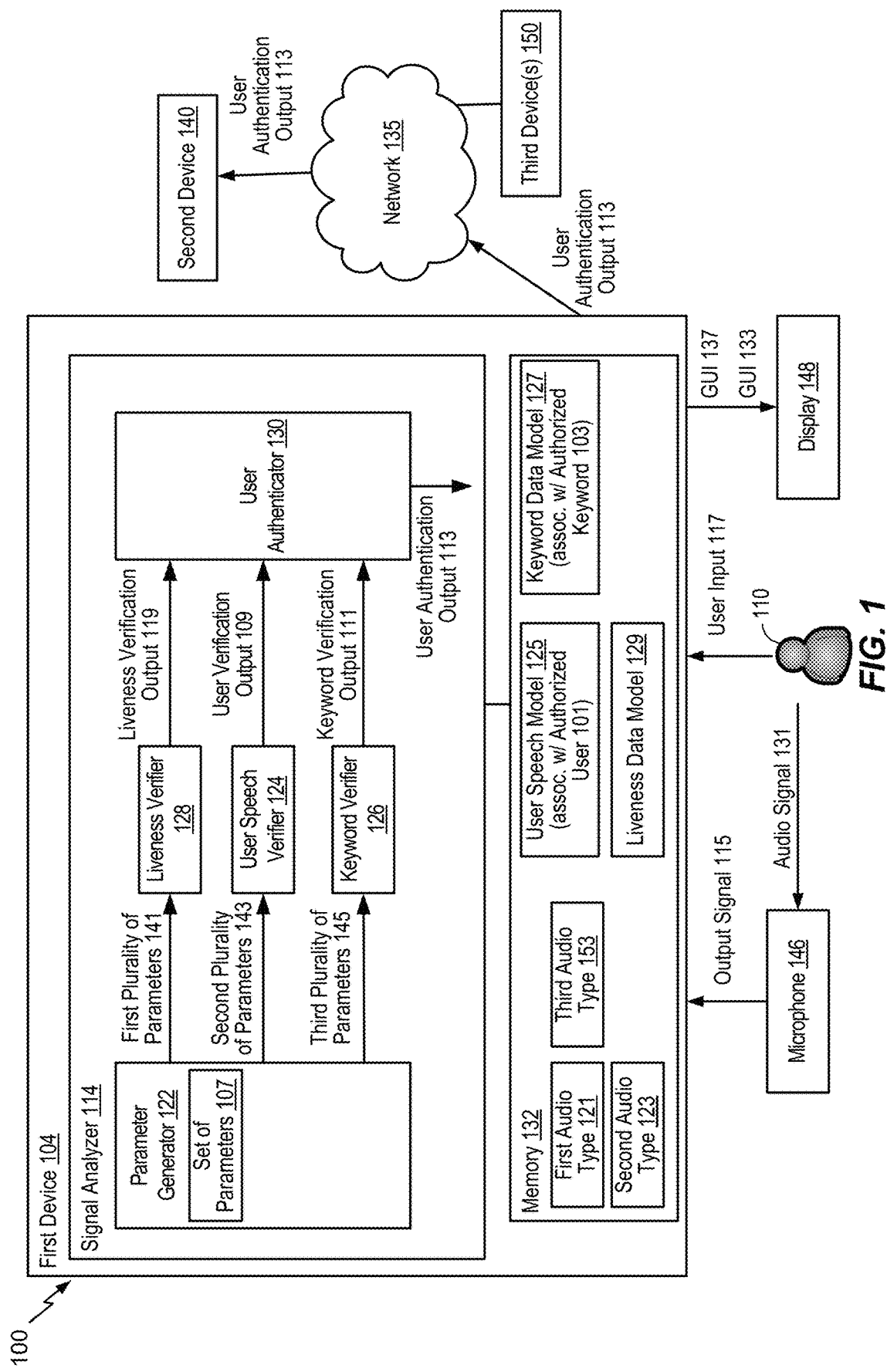
FIG. 1 is a block diagram of a particular illustrative aspect of a system operable to perform user authentication based on liveness verification, keyword verification, and user speech verification.

Systems and methods of user authentication are disclosed. In a particular example, a device receives an output signal from a microphone and performs user authentication based on the output signal. For example, the device determines that user authentication is successful in response to determining that the output signal corresponds to spoken speech, to an authorized user, and to an authorized keyword. To illustrate, the device determines that the output signal correspond to spoken speech in response to detecting a match between the output signal and a liveness model. The device determines that the output signal corresponds to an authorized user in response to detecting a match between the output signal and a user speech model of the authorized user. The device determines that the output signal corresponds to an authorized keyword in response to detecting a match between the output signal and a keyword model of the authorized keyword.

The device may receive the liveness model from another device, such as a server. The liveness model may be based on first audio samples of spoken speech of a test population that is received by microphones. Second audio samples may correspond to spoken speech that is received by microphones, recorded, played back by speakers, and received again by the microphones. Each pass through a processing stage (e.g., transcoding, encoding, decoding, filtering, etc.) may modify some characteristics of the processed signals. First characteristics of the first audio samples differ from second characteristics of the second audio samples. For example, the first characteristics may be indicative of spoken speech that has passed through fewer processing stages (e.g., received by microphones, and not recorded, played back, or received by microphones again). The second characteristics may be indicative of playback of recorded speech, such as spoken speech that has passed through more processing stages (e.g., received by microphones, stored, played back, and received by microphones again). The liveness model may be based on the first characteristics, the second characteristics, or a combination thereof.

The device may determine that the output signal corresponds to spoken speech in response to determining, based on the liveness model, that a characteristic of the output signal matches one or more of the first characteristics. Alternatively, the device may determine that the output signal corresponds to playback of recorded speech in response to determining, based on the liveness model, that a characteristic of the output signal matches one or more of the second characteristics. When the output signal corresponds to spoken speech, the device may perform the user verification based on determining whether the output signal corresponds to an authorized user, an authorized keyword, or both. When the output signal corresponds to playback of recorded speech, the device may generate an output indicating that user verification has failed. The device may thus prevent false authentication based on spoofing when the output signal corresponds to playback of recorded speech.

Referring to FIG. 1, a system operable to perform user authentication is shown and generally designated 100. The system 100 includes a first device 104. The first device 104 may be communicatively coupled, via a network 135, to a second device 140, one or more third devices 150, or a combination thereof. The network 135 includes at least one of a cellular network, an intern& network, an intranet network, a wired network, or a wireless network. The second device 140 may include a restricted access device. For example, the first device 104 may enable access to the second device 140 for authorized users and may restrict access to the second device 140 for unauthorized users. The third device(s) 150 may include a server, a base station, or both.

The first device 104 is coupled to or includes a microphone 146. The first device 104 may also be coupled to or include a display 148. The first device 104 includes a signal analyzer 114 coupled to a memory 132. The memory 132 is configured to store a user speech model 125 associated with an authorized user 101. For example, the user speech model 125 may be based on speech of the authorized user 101 received during an enrollment phase. To illustrate, the user speech model 125 may be trained based on input audio signals associated with the authorized user 101. The memory 132 is configured to store a keyword data model 127 associated with an authorized keyword 103 (e.g., a password or an activation keyword). The keyword data model 127 may be based on one or more users saying the authorized keyword 103. The one or more users may include the authorized user 101, one or more additional users, or a combination thereof. The memory 132 is configured to store a liveness data model 129. The liveness data model 129 may be based on first audio samples corresponding to spoken speech, second audio samples corresponding to playback of recorded speech, or a combination thereof, as further described with reference to FIG. 2. The liveness data model 129 may be based on speech of one or more users, such as the authorized user 101, one or more additional users, or a combination thereof. In a particular aspect, the liveness data model 129, the keyword data model 127, or both are user-independent. For example, the liveness data model 129, the keyword data model 127, or both, may be independent of the speech of the authorized user 101. The user speech model 125 may be the same as distinct from the liveness data model 129, the keyword data model 127, or both. The liveness data model 129 may be the same as or distinct from the keyword data model 127.

The signal analyzer 114 includes a parameter generator 122 coupled to a liveness verifier 128, to a user speech verifier 124, and to a keyword verifier 126. The signal analyzer 114 includes a user authenticator 130 coupled to the liveness verifier 128, to the user speech verifier 124, and to the keyword verifier 126.

The microphone 146 is configured to generate an output signal 115 (e.g., an output audio signal) in response to receiving an audio signal 131 (e.g., an input audio signal). The parameter generator 122 is configured to extract a set of parameters 107 from the output signal 115. The liveness verifier 128 is configured to determine, based on the liveness data model 129 and a first plurality of parameters 141 of the set of parameters 107, whether the output signal 115 (or the audio signal 131) corresponds to a first audio type 121 indicative of live speech (e.g., spoken speech) or to a second audio type 123 indicative of playback of recorded speech. The first plurality of parameters 141 may indicate a dynamic frequency range of the output signal 115. In a particular aspect, the liveness verifier 128 is configured to determine whether the output signal 115 (or audio signal 131) corresponds to the first audio type 121, the second audio type 123, or a third audio type 153 (e.g., noise, non-speech audio, music, etc.).

The user speech verifier 124 is configured to determine, based on the user speech model 125 and a second plurality of parameters 143 of the set of parameters 107, whether the output signal 115 (or the audio signal 131) corresponds to speech of the authorized user 101. The keyword verifier 126 is configured to determine, based on the keyword data model 127 and a third plurality of parameters 145 of the set of parameters 107, whether the output signal 115 (or the audio signal 131) corresponds to the authorized keyword 103. The user authenticator 130 is configured to generate a user authentication output 113 indicating whether user authentication is successful. The user authentication output 113 is based on at least one of a liveness verification output 119 of the liveness verifier 128, a user verification output 109 of the user speech verifier 124, or a keyword verification output 111 of the keyword verifier 126.

During operation, the microphone 146 generates the output signal 115 responsive to receiving the audio signal 131. For example, the audio signal 131 may be generated by a user 110 by speaking or by using a playback device to playback a recorded audio signal. The signal analyzer 114 may determine that user authentication is to be performed in response to receiving a user input 117 indicating that user authentication is to be performed. In a particular implementation, the signal analyzer 114 may determine that the user authentication is to be performed independently of receiving the user input 117. For example, the signal analyzer 114 may determine that the user authentication is to be performed in response to determining that a timer has expired. The signal analyzer 114 may set the timer based on user input, a default value, a configuration setting, or a combination thereof.

In a particular aspect, the signal analyzer 114 generates the authorized keyword 103 in response to determining that the user authentication is to be performed. In an alternate aspect, the authorized keyword 103 may correspond to a default value, user input, or both. For example, the authorized keyword 103 may be provided by the authorized user 101 during an enrollment phase. The signal analyzer 114 may, in response to determining that user authentication is to be performed, generate a graphical user interface (GUI) 133 indicating the authorized keyword 103 and may provide the GUI 133 to the display 148. The microphone 146 may receive the audio signal 131 subsequent to the signal analyzer 114 providing the GUI 133 to the display 148. For example, the audio signal 131 may correspond to the user 110 saying the authorized keyword 103.

Performing the user authentication includes the parameter generator 122 extracting a set of parameters 107 from the output signal 115. The set of parameters 107 indicate characteristics (e.g., frequency characteristics, such as dynamic frequency range) of the output signal 115. For example, the set of parameters 107 may indicate frequency features, dynamic frequency range, spectrum parameters, cepstral features, Mel frequency cepstral coefficient (MFCC) parameters, perceptual linear predictive cepstral coefficient parameters, instantaneous frequency cosine coefficient (IFCC) parameters, zero crossing rate, pitch, auto-correlation parameters, linear predictive coding (LPC) parameters, or a combination thereof.

The set of parameters 107 includes the first plurality of parameters 141, the second plurality of parameters 143, the third plurality of parameters 145, or a combination thereof. The first plurality of parameters 141 may be the same as or distinct from the second plurality of parameters 143 or the third plurality of parameters 145. In a particular example, the first plurality of parameters 141 may include at least some of the second plurality of parameters 143, none of the second plurality of parameters 143, at least some of the third plurality of parameters 145, none of the third plurality of parameters 145, one or more additional parameters, or a combination thereof. The second plurality of parameters 143 may be the same as or distinct from the third plurality of parameters 145. In a particular example, the second plurality of parameters 143 may include at least some of the first plurality of parameters 141, none of the first plurality of parameters 141, at least some of the third plurality of parameters 145, none of the third plurality of parameters 145, one or more additional parameters, or a combination thereof. In a particular example, the third plurality of parameters 145 may include at least some of the first plurality of parameters 141, none of the first plurality of parameters 141, at least some of the second plurality of parameters 143, none of the second plurality of parameters 143, one or more additional parameters, or a combination thereof.

The liveness verifier 128 performs liveness verification. For example, the liveness verifier 128 determines whether the liveness data model 129 indicates, based on the first plurality of parameters 141, that the output signal 115 corresponds to the first audio type 121 indicating spoken speech, to the second audio type 123 corresponding to playback of recorded speech, or to the third audio type 153 corresponding to neither spoken speech nor played-back speech. In a particular aspect, the liveness data model 129 is based on a first set of recordings corresponding to spoken speech, a second set of recordings corresponding to played-back speech, or a combination thereof, as further described with reference to FIG. 2. For example, the liveness data model 129 may be based on first parameters corresponding to the first set of recordings, second parameters corresponding to the second set of recordings, or a combination thereof. Second dynamic ranges of the second parameters corresponding to played-back speech may be narrower for particular frequencies as compared to first dynamic ranges of the first parameters corresponding to spoken speech for the same frequencies. In a particular aspect, the particular frequencies include a first frequency range that is lower than a first frequency threshold, a second frequency range that is higher than a second frequency threshold, a third frequency range that is between a third frequency threshold and a fourth frequency threshold, or a combination thereof.

In a particular aspect, the liveness verifier 128 determine that the output signal 115 corresponds to the third audio type 153 in response to determining that the third plurality of parameters 145 indicate that the output signal 115 corresponds to non-speech audio, such as noise, music, silence, or other non-speech audio. In this aspect, the liveness verifier 128 may generate the liveness verification output 119 having the first value (e.g., 0) indicating that liveness verification failed in response to determining that the output signal 115 corresponds to the third audio type 153. Alternatively, the liveness verifier 128 may, in response to determining that the third plurality of parameters 145 indicate that the output signal 115 corresponds to speech, determine whether the output signal 115 corresponds to the first audio type 121 or the second audio type 123.

The liveness verifier 128 may determine that the liveness data model 129 indicates that the output signal 115 corresponds to the first audio type 121 in response to determining that the liveness data model 129 indicates that the first plurality of parameters 141 corresponds more closely with the first parameters of the first set of recordings than to the second parameters of the second set of recordings. Alternatively, the liveness verifier 128 may determine that the liveness data model 129 indicates that the output signal 115 corresponds to the second audio type 123 in response to determining that the liveness data model 129 indicates that the first plurality of parameters 141 corresponds more closely to the second parameters of the second set of recordings than to the first parameters of the first set of recordings.

In a particular example, the liveness verifier 128 determines that the liveness data model 129 indicates that the output signal 115 corresponds to the first audio type 121 in response to determining that the liveness data model 129 indicates that a dynamic frequency range of the output signal 115 corresponds more closely to first dynamic frequency ranges of the first set of recordings than to second dynamic frequency ranges of the second set of recordings. Alternatively, the liveness verifier 128 determines that the liveness data model 129 indicates that the output signal 115 corresponds to the second audio type 123 in response to determining that the liveness data model 129 indicates that the dynamic frequency range of the output signal 115 corresponds more closely to the second dynamic frequency ranges of the second set of recordings than to the first dynamic frequency ranges of the first set of recordings.

In a particular aspect, the liveness verifier 128 determines that the liveness data model 129 indicates a first probability that the first plurality of parameters 141 correspond to the first parameters of the first set of recordings and a second probability that the first plurality of parameters 141 correspond to the second parameters of the second parameters of the second set of recordings. In this aspect, the liveness verifier 128 determines that the liveness data model 129 indicates that the output signal 115 corresponds to the first audio type 121 in response to determining that the first probability is greater than or equal to the second probability. Alternatively, the liveness verifier 128 determines that the liveness data model 129 indicates that the output signal 115 corresponds to the second audio type 123 in response to determining that the second probability is greater than or equal to the first probability.

In a particular aspect, the liveness data model 129 is based on the first set of recordings corresponding to spoken speech and is independent of the second set of recordings corresponding to played-back speech. The liveness verifier 128 determines that the liveness data model 129 indicates a first probability that the first plurality of parameters 141 corresponds to the first parameters of the first set of recordings. The liveness verifier 128 determines that the output signal 115 corresponds to the first audio type 121 in response to determining that the first probability is greater than or equal to a first probability threshold. Alternatively, the liveness verifier 128 determines that the output signal 115 corresponds to the second audio type 123 in response to determining that the first probability is less than the first probability threshold.

In a particular aspect, the liveness data model 129 is based on the second set of recordings corresponding to played-back speech and is independent of the first set of recordings corresponding to spoken speech. The liveness verifier 128 determines that the liveness data model 129 indicates a second probability that the first plurality of parameters 141 corresponds to the second parameters of the second set of recordings. The liveness verifier 128 determines that the output signal 115 corresponds to the first audio type 121 in response to determining that the second probability is less than or equal to a second probability threshold. Alternatively, the liveness verifier 128 determines that the output signal 115 corresponds to the second audio type 123 in response to determining that the second probability is greater than or equal to the second probability threshold.

The liveness verifier 128 generates a liveness verification output 119 having a first value (e.g., 0) in response to determining that the output signal 115 corresponds to the second audio type 123 or the third audio type 153. Alternatively, the liveness verifier 128 generates the liveness verification output 119 having a second value (e.g., 1) in response to determining that the output signal 115 corresponds to the first audio type 121. The liveness verifier 128 may provide the liveness verification output 119 to the user authenticator 130.

The user speech verifier 124 performs user speech verification. For example, the user speech verifier 124 determines whether the user speech model 125 indicates, based on the second plurality of parameters 143, that the output signal 115 corresponds to speech of the authorized user 101. In a particular aspect, the user speech model 125 is based on first recordings of speech of the authorized user 101, second recordings of one or more users that are distinct from the authorized user 101, or a combination thereof. For example, the user speech model 125 may be based on first particular parameters corresponding to the first recordings, second particular parameters corresponding to the second recordings, or a combination thereof. The first particular parameters may indicate particular speech characteristics that are distinct from speech characteristics indicated by the second particular parameters. For example, the first particular parameters may indicate a particular pitch, a particular pronunciation of particular sounds, a particular energy for particular frequencies, particular MFCC parameter values, particular frequency feature values, particular spectrum parameter values, particular cepstral feature values, particular perceptual linear predictive cepstral coefficient parameter values, particular IFCC parameter values, a particular zero crossing rate, particular auto-correlation parameter values, particular linear predictive coding (LPC) parameter values, or a combination thereof.

The user speech verifier 124 may determine that the user speech model 125 indicates that the output signal 115 corresponds to speech of the authorized user 101 in response to determining that the user speech model 125 indicates that the second plurality of parameters 143 corresponds more closely with the first particular parameters of the first recordings than to the second particular parameters of the second recordings. Alternatively, the user speech verifier 124 may determine that the user speech model 125 indicates that the output signal 115 does not correspond to speech of the authorized user 101 in response to determining that the user speech model 125 indicates that the second plurality of parameters 143 corresponds more closely to the second particular parameters of the second recordings than to the first particular parameters of the first recordings.

In a particular aspect, the user speech model 125 is based on the first recordings corresponding to the authorized user 101 and is independent of the second recordings corresponding to other users. The user speech verifier 124 determines that the user speech model 125 indicates a first probability that the second plurality of parameters 143 corresponds to the first particular parameters of the first recordings. The user speech verifier 124 determines that the output signal 115 corresponds to speech of the authorized user 101 in response to determining that the first probability is greater than or equal to a first probability threshold. Alternatively, the user speech verifier 124 determines that the output signal 115 does not correspond to speech of the authorized user 101 (e.g., corresponds to a user other than the authorized user 101) in response to determining that the first probability is less than the first probability threshold.

The user speech verifier 124 generates a user verification output 109 having a first value (e.g., 0) in response to determining that the output signal 115 does not correspond to speech of the authorized user 101. Alternatively, the user speech verifier 124 generates the user verification output 109 having a second value (e.g., 1) in response to determining that the output signal 115 corresponds to speech of the authorized user 101. The user speech verifier 124 may provide the user verification output 109 to the user authenticator 130.

The keyword verifier 126 performs keyword verification. For example, the keyword verifier 126 determines whether the keyword data model 127 indicates, based on the third plurality of parameters 145, that the output signal 115 corresponds to the authorized keyword 103. In a particular aspect, the keyword data model 127 is based on recordings of one or more users (e.g., the authorized user 101) saying the authorized keyword 103, other words, or a combination thereof. For example, the keyword data model 127 may be based on parameters corresponding to the recordings. A subset of the parameters may indicate particular speech characteristics that associated with saying the authorized keyword 103. For example, the subset of the parameters may indicate particular sounds, a particular pitch, a particular energy for particular frequencies, particular MFCC parameter values, particular frequency feature values, particular spectrum parameter values, particular cepstral feature values, particular perceptual linear predictive cepstral coefficient parameter values, particular IFCC parameter values, a particular zero crossing rate, particular auto-correlation parameter values, particular linear predictive coding (LPC) parameter values, or a combination thereof.

The keyword verifier 126 may determine that the keyword data model 127 indicates that the output signal 115 corresponds to the authorized keyword 103 in response to determining that the keyword data model 127 indicates a particular probability that the third plurality of parameters 145 corresponds to the subset of the parameters associated with the authorized keyword 103. The keyword verifier 126 determines that the output signal 115 corresponds to the authorized keyword 103 in response to determining that the particular probability is greater than or equal to a probability threshold. Alternatively, the keyword verifier 126 determines that the output signal 115 does not correspond to the authorized keyword 103 (e.g., corresponds to a word other than the authorized keyword 103) in response to determining that the particular probability is less than the probability threshold.

In a particular aspect, the keyword verifier 126 generates text by performing speech-to-text conversion on the third plurality of parameters 145. The keyword verifier 126 determines that the output signal 115 corresponds to the authorized keyword 103 in response to detecting a match between the text and the authorized keyword 103. Alternatively, the keyword verifier 126 determines that the output signal 115 does not correspond to the authorized keyword 103 in response to detecting that the text does not match the authorized keyword 103. In this aspect, the keyword data model 127 includes the authorized keyword 103 (e.g., a text representation of the authorized keyword 103).

The keyword verifier 126 generates a keyword verification output 111 having a first value (e.g., 0) in response to determining that the output signal 115 does not correspond to the authorized keyword 103. Alternatively, the keyword verifier 126 generates the keyword verification output 111 having a second value (e.g., 1) in response to determining that the output signal 115 corresponds to the authorized keyword 103. The keyword verifier 126 may provide the keyword verification output 111 to the user authenticator 130.

In a particular aspect, the user input 117 includes the audio signal 131. For example, the signal analyzer 114 may determine that the user authentication is to be performed in response to determining that the audio signal 131 corresponds to the authorized keyword 103. In this aspect, prior to the signal analyzer 114 determining that user authentication is to be performed, the parameter generator 122 may extract the set of parameters 107, the keyword verifier 126 may generate the keyword verification output 111, or both. The signal analyzer 114 may determine that the user authentication is to be performed in response to determining that the keyword verification output 111 has a second value (e.g., 1) indicating that the output signal 115 (and the audio signal 131) corresponds to the authorized keyword 103. The user speech verifier 124 may generate the user verification output 109 based at least in part on determining that user authentication is to be performed. The liveness verifier 128 may generate the liveness verification output 119 based at least in part on determining that user authentication is to be performed.

The user authenticator 130 generates a user authentication output 113 having a first value (e.g., 0) indicating that user authentication failed in response to determining that the liveness verification output 119 indicates that the output signal 115 corresponds to the second audio type 123 indicating played-back speech or to the third audio type 153 indicating non-speech audio, that the user verification output 109 indicates that the output signal 115 does not correspond to speech of the authorized user 101, that the keyword verification output 111 indicates that the output signal 115 does not correspond to the authorized keyword 103, or a combination thereof. Alternatively, the user authenticator 130, in response to determining that the liveness verification output 119 indicates that the output signal 115 corresponds to the first audio type 121 indicative of spoken speech, that the user verification output 109 indicates that the output signal 115 corresponds to speech of the authorized user 101, and that the keyword verification output 111 indicates that the output signal 115 corresponds to the authorized keyword 103, generates a user authentication output 113 having a second value (e.g., 1) indicating that user authentication is successful.

The signal analyzer 114 may generate a GUI 137 indicating the user authentication output 113. For example, the GUI 137 may indicate whether the user authentication is successful. When the user authentication output 113 has the first value (e.g., 0) indicating that the user authentication failed, the GUI 137 may include at least one reason for the failure. For example, the GUI 137 may indicate the liveness verification output 119, the user verification output 109, the keyword verification output 111, or a combination thereof. In a particular aspect, the GUI 137 may indicate whether the output signal 115 is identified as non-speech audio, spoken speech, or played-back speech. For example, the GUI 137 may indicate whether the output signal 115 corresponds to the first audio type 121, the second audio type 123 or the third audio type 153.

When the user authentication output 113 has the first value (e.g., 0) indicating that the user authentication failed, the signal analyzer 114 may generate an alert, lock an account associated with the authorized user 101, restrict access (e.g., by the user 110) to a protected resource (e.g., particular data, a particular application, or the second device 140), or a combination thereof.

When the user authentication output 113 has the second value (e.g., 1) indicating that the user authentication is successful, the signal analyzer 114 may enable access (e.g., by the user 110) to a protected resource (e.g., the particular data, the particular application, or the second device 140), update one or more of the user speech model 125, the keyword data model 127, the liveness data model 129 based on the set of parameters 107, or a combination thereof. For example, the signal analyzer 114 may, in response to determining that the user authentication output 113 has the second value (e.g., 1), update the user speech model 125 based on the second plurality of parameters 143, update the keyword data model 127 based on the third plurality of parameters 145, update the liveness data model 129 based on the first plurality of parameters 141, or a combination thereof.

In a particular example, the signal analyzer 114 initiates transmission of authentication data to the second device 140 in response to determining that the user authentication output 113 has the second value (e.g., 1) indicating that the user authentication is successful. The authentication data may include an alphanumeric password, biometric data, or both, associated with the authorized user 101. For example, the second device 140 may be associated with a financial institution and the authentication data may be associated with an account of the authorized user 101 at the financial institution.

In a particular aspect, the signal analyzer 114 may initiate transmission of the user authentication output 113 from the first device 104 to the second device 140. In a particular example, the second device 140 tracks a number of user authentication attempts at the first device 104, a first number of successful user authentication events at the first device 104, a second number of unsuccessful user authentication events at the first device 104, or a combination thereof. In this example, the second device 140, in response to receiving the user authentication output 113, increments (e.g., by 1) the number of user authentication attempts. The second device 140 may, in response to determining that the user authentication output 113 has a first value (e.g., 0) indicating that the user authentication failed, increment (e.g., by 1) the second number of unsuccessful user authentication events, generate an alert, lock an account associated with the authorized user 101, or a combination thereof. The second device 140 may, in response to determining that the user authentication output 113 has a second value (e.g., 1) indicating that the user authentication is successful, increment the first number of successful user authentication events, enable access by the first device 104 to a protected resource (e.g., data, application, or device), or a combination thereof.

In a particular aspect, each of the liveness verifier 128, the user speech verifier 124, and the keyword verifier 126 may concurrently process the first plurality of parameters 141, the second plurality of parameters 143, and the third plurality of parameters 145, respectively. The user authenticator 130 may generate the user authentication output 113 having the first value (e.g., 0) indicating that user authentication failed in response to receiving at least one of the liveness verification output 119 having the first value (e.g., 0) indicating that the output signal 115 corresponds to the second audio type 123 or the third audio type 153, the user verification output 109 having the first value (e.g., 0) indicating that the output signal 115 does not correspond to speech of the authorized user 101, or the keyword verification output 111 having the first value (e.g., 0) indicating that the output signal 115 does not correspond to the authorized keyword 103. For example, the user authenticator 130 may generate the user authentication output 113 having the first value (e.g., 0) independently of (e.g., prior to) receiving the remaining of the liveness verification output 119, the user verification output 109, or the keyword verification output 111.

It should be understood that the signal analyzer 114 may perform the liveness verification, the keyword verification, or the user speech verification in any order. For example, the user speech verifier 124 may perform the user speech verification in response to receiving the liveness verification output 119 having the second value (e.g., 1) indicating that the output signal 115 corresponds to spoken speech and the keyword verifier 126 may perform the keyword verification in response to receiving the user verification output 109 having the second value (e.g., 1) indicating that the output signal 115 corresponds to speech of the authorized user 101. In this example, the user authenticator 130 may generate the user authentication output 113 having the second value (e.g., 1) indicating that user authentication is successful in response to receiving the keyword verification output 111 having the second value indicating that the output signal 115 corresponds to the authorized keyword 103. When the liveness verification output 119 has the first value (e.g., 0) indicating that the output signal 115 corresponds to the second audio type 123 or to the third audio type 153, the user speech verifier 124 may refrain from performing the user speech verification and the keyword verifier 126 may refrain from performing the keyword verification. The user authenticator 130 may, in response to determining that the liveness verification output 119 has the first value (e.g., 0) and independently of the user verification output 109 and the keyword verification output 111, generate the user authentication output 113 having the first value (e.g., 0) indicating that the user authentication is unsuccessful.

In a particular example, the keyword verifier 126 may generate the keyword verification output 111 in response to receiving the liveness verification output 119 having the second value (e.g., 1) indicating that the output signal 115 corresponds to spoken speech and the user speech verifier 124 may generate the user verification output 109 in response to receiving the keyword verification output 111 having the second value (e.g., 1) indicating that the output signal 115 corresponds to the authorized keyword 103. In this example, the user authenticator 130 may generate the user authentication output 113 having the second value (e.g., 1) indicating that user authentication is successful in response to receiving the user verification output 109 having the second value indicating that the output signal 115 corresponds to the authorized user 101.

In a particular example, the liveness verifier 128 may perform the liveness verification in response to determining that the output signal 115 corresponds to the authorized keyword 103, speech of the authorized user 101, or both. In a particular example, the user speech verifier 124 may perform the user verification in response to determining that the output signal 115 corresponds to the authorized keyword 103, the first audio type 121, or both. In a particular example, the keyword verifier 126 may perform the keyword verification in response to determining that the output signal 115 corresponds to the first audio type 121, speech of the authorized user 101, or both.

When the liveness verification output 119 has the first value (e.g., 0) indicating that the output signal 115 corresponds to the second audio type 123 or to the third audio type 153, the user speech verifier 124 may refrain from performing the user speech verification and the keyword verifier 126 may refrain from performing the keyword verification. The user authenticator 130 may, in response to determining that the liveness verification output 119 has the first value (e.g., 0) and independently of the user verification output 109 and the keyword verification output 111, generate the user authentication output 113 having the first value (e.g., 0) indicating that the user authentication is unsuccessful.

In a particular aspect, the signal analyzer 114 may, in response to determining that one of the liveness verification, the keyword verification, or the user speech verification has failed, refrain from performing the remaining of the liveness verification, the keyword verification, or the user speech verification. In this aspect, the signal analyzer 114 may, in response to determining that one of the liveness verification, the keyword verification, or the user speech verification has failed, generate the user authentication output 113 having the first value (e.g., 0) indicating that the user authentication failed.

The system 100 thus enables user authentication that prevents false authentication based on spoofing by detecting whether the output signal 115 corresponds to the first audio type 121 indicative of spoken speech or to the second audio type 123 indicative of playback of recorded speech, whether the output signal 115 corresponds to the authorized user 101, whether the output signal 115 corresponds to the authorized keyword 103, or a combination thereof.

It should be understood that although the signal analyzer 114 is described as including the parameter generator 122, the liveness verifier 128, the user speech verifier 124, the keyword verifier 126, and the user authenticator 130, in other examples, one or more of the parameter generator 122, the liveness verifier 128, the user speech verifier 124, the keyword verifier 126, and the user authenticator 130 may be external to the first device 104. For example, the third device(s) 150 may include one or more of the parameter generator 122, the liveness verifier 128, the user speech verifier 124, the keyword verifier 126, or the user authenticator 130. To illustrate, in an implementation in which the parameter generator 122 is included in a base station, the first device 104, in response to receiving the user input 117, sends a notification to the base station, and the parameter generator 122 generates the set of parameters 107 in response to receiving the notification. In this implementation, the output signal 115 may correspond to an audio signal to be transmitted to the first device 104 or from the first device 104, for example, during an audio call. The third device(s) 150 may be communicatively coupled to the first device 104 and may include a server, a base station, or both. The third device(s) 150 may have more available resources, such as processing cycles, memory, power, or a combination thereof, than the first device 104.

It should be noted that in the following description, various functions performed by the system 100 of FIG. 1 are described as being performed by certain components or modules. However, this division of components and modules is for illustration only. In an alternate aspect, a function performed by a particular component or module may be divided amongst multiple components or modules. Moreover, in an alternate aspect, two or more components or modules of FIG. 1 may be integrated into a single component or module. Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

Figure 2:
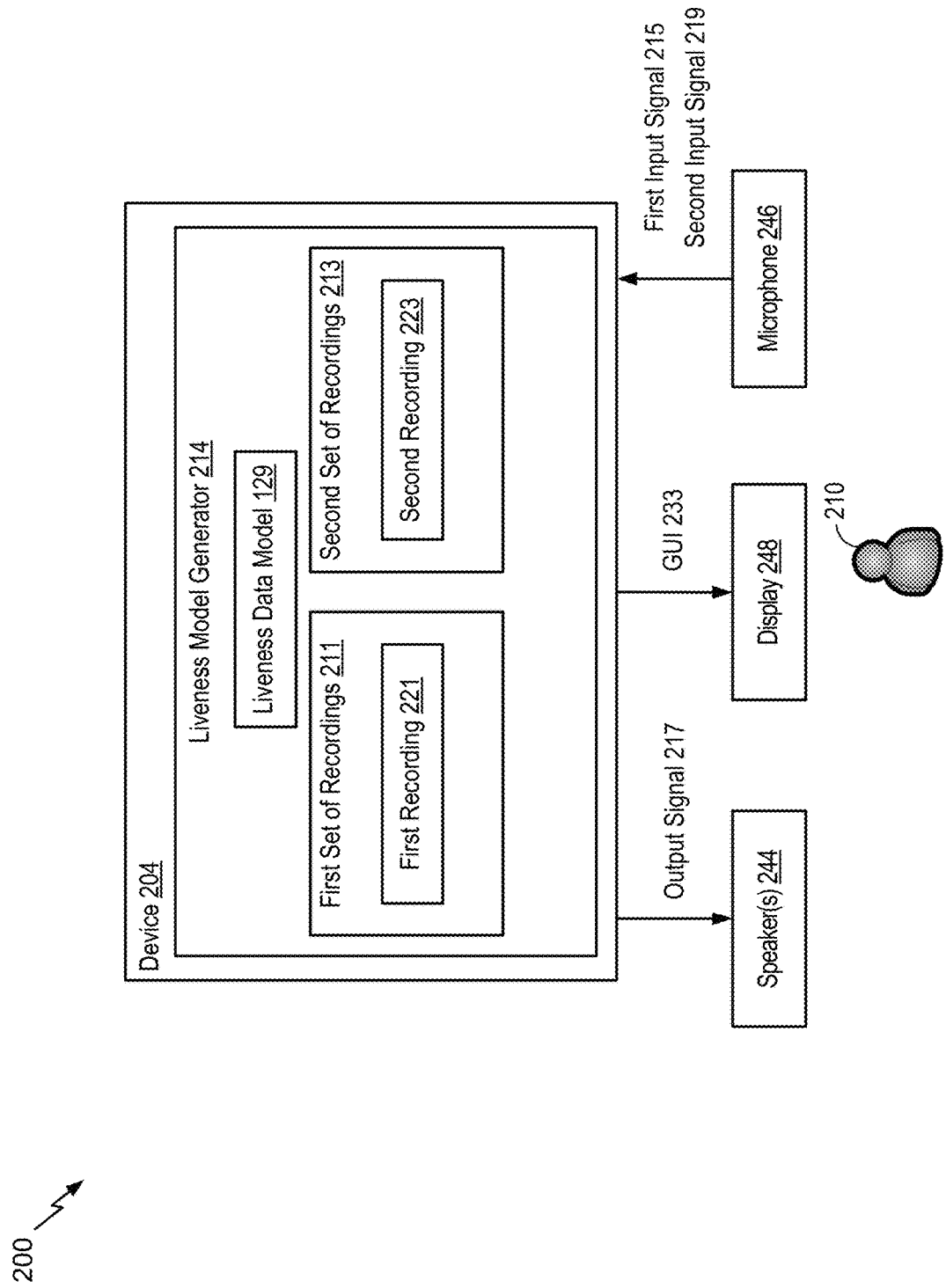
FIG. 2 is a diagram to illustrate particular aspects of a system operable to generate a liveness model that is used by the system of FIG. 1.

Referring to FIG. 2, a system operable to generate the liveness data model 129 is shown and generally designated 200. The system 200 includes a device 204. The device 204 includes a liveness model generator 214. The device 204 includes or is coupled to one or more speakers 244, a microphone 246, a display 248, or a combination thereof. In a particular aspect, the system 200 corresponds to the system 100 of FIG. 1. For example, the first device 104 of FIG. 1 may include the device 204 or may be communicatively coupled to the device 204.

During operation, a user 210 provides a user input to the device 204 indicating that the liveness data model 129 is to be generated (or updated). The liveness model generator 214, in response to receiving the user input, generates a GUI 233 including a first option to initiate capture of spoken speech and a second option to stop capture of spoken speech. The GUI 233 may indicate one or more phrases that the user 210 is to speak. The liveness model generator 214 provides the GUI 233 to the display 248.

The user 210 selects the first option of the GUI 233 at a first time, speaks into the microphone 246, and selects the second option of the GUI 233 at a second time. The microphone 246 generates the first input signal 215 corresponding to the speech of the user 210. The liveness model generator 214, in response to receiving the selection of the second option, generates a first recording 221 corresponding to a portion of the first input signal 215 received from the microphone 246 between the first time and the second time. The liveness model generator 214 adds the first recording 221 to a first set of recordings 211. The first set of recordings 211 is associated with the first audio type 121 of FIG. 1 corresponding to spoken speech.

In a particular aspect, the liveness model generator 214, subsequent to generating the first recording 221, updates the GUI 233 to indicate that captured audio is going to be played-back for model generation and that the user 210 is to remain silent during playback. The liveness model generator 214 generates an output signal 217 based on the first recording 221 and provides the output signal 217 to the speaker(s) 244. The speaker(s) 244 outputs, from a third time to a fourth time, an audio signal corresponding to the output signal 217. The microphone 246 generates a second input signal 219. The second input signal 219 may correspond to audio captured by the microphone 246. For example, the second input signal 219 may include the audio signal received from the speaker(s) 244, environmental sounds (e.g., background noise), or a combination thereof. The liveness model generator 214 generates a second recording 223 corresponding to a portion of the second input signal 219 received from the microphone 246 between the third time and the fourth time. The liveness model generator 214 adds the second recording 223 to the second set of recordings 213. The second set of recordings 213 is associated with the second audio type 123 of FIG. 1. The first recording 221 differs from the second recording 223 in that the first recording 221 corresponds to speech of the user 210 that has passed through fewer processing stages (e.g., received by the microphone 246, and not played-back by the speaker(s) 244 and received by the microphone 246 again). In a particular aspect, the second recording 223 also differs from the first recording 221 in that the second recording 223 corresponds to audio that includes additional sounds (e.g., background noise).

The liveness model generator 214 may, subsequent to generating the second recording 223, update the GUI 233 to indicate the first option and the second option for initiating generation of additional recordings. The liveness model generator 214 may, in response to determining that a first size of the first set of recordings 211 is greater than or equal to a first recording threshold, that a second size of the second set of recordings 213 is greater than or equal to a second recording threshold, or both, generate (or update) the liveness data model 129 based on the first set of recordings 211, the second set of recordings 213, or a combination thereof. As used herein, a "size of a set of recordings" refers to a count of the recordings in the set or a sum of a size (e.g., a number of bits or bytes) of the recordings in the set. The liveness data model 129 may include a machine-learning data model.

The liveness model generator 214 may train the liveness data model 129 based on the first set of recordings 211, the second set of recordings 213, or a combination thereof. For example, the liveness model generator 214 may extract a first set of parameters from the first recording 221. The liveness model generator 214 may update the liveness data model 129 based on the first set of parameters corresponding to the first audio type 121. The first set of parameters indicates audio characteristics (e.g., frequency characteristics) of the first recording 221. The liveness model generator 214 may extract a second set of parameters from the second recording 223. The liveness model generator 214 may update the liveness data model 129 based on the second set of parameters corresponding to the second audio type 123. The second set of parameters indicates audio characteristics (e.g., frequency characteristics) of the second recording 223. The audio characteristics indicated by the second set of parameters differ from the audio characteristics indicated by the first set of parameters. For example, the second set of parameters may correspond to a narrower dynamic frequency range as compared to the first set of parameters. First dynamic frequency ranges of the first set of recordings 211 may be narrower (e.g., on average) than second dynamic frequency ranges of the second set of recordings 213. The liveness model generator 214 may continue to train the liveness data model 129 based on one or more additional recordings of the first set of recordings 211, the second set of recordings 213, or a combination thereof.

The device 204 may provide the liveness data model 129 to the first device 104 of FIG. 1. For example, the device 204 may push the liveness data model 129 to the first device 104 in response to receiving a user input indicating that the liveness data model 129 is to be provided to the first device 104. As another example, the first device 104 may pull the liveness data model 129 from the device 204. To illustrate, the device 204 may provide the liveness data model 129 to the first device 104 in response to receiving a request for the liveness data model 129 from the first device 104.

It should be understood that although the liveness model generator 214 is described as generating the first set of recordings 211, the second set of recordings 213, or a combination thereof, in some implementations the liveness model generator 214 receives the first set of recordings 211, the second set of recordings 213, or a combination thereof, from another device.

The liveness model generator 214 thus enables generation of the liveness data model 129 based on the first set of recordings 211 corresponding to spoken speech, the second set of recordings 213 corresponding to played-back speech, or a combination thereof. The liveness data model 129 may be used to prevent false authentication by spoofing by detecting whether an audio signal corresponds to spoken speech or played-back speech.

Figure 3:
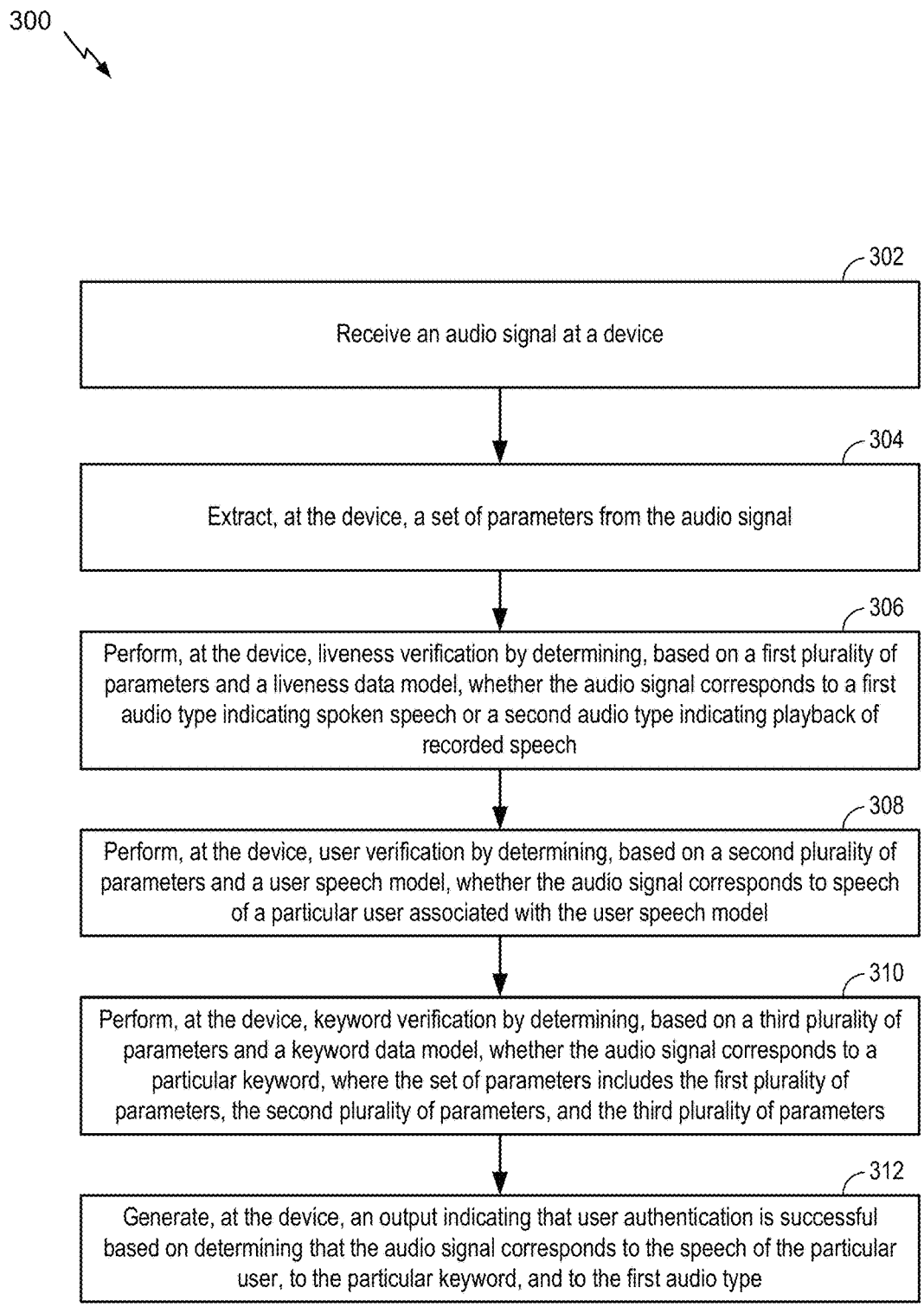
FIG. 3 is a flow chart to illustrate an aspect of a method of performing user authentication.

Referring to FIG. 3, a method of operation is shown and generally designated 300. The method 300 may be performed by the signal analyzer 114, the first device 104, the third device(s) 150, the system 100 of FIG. 1, or a combination thereof.

The method 300 includes receiving an audio signal at a device, at 302. For example, the first device 104 of FIG. 1 may receive the output signal 115, as described with reference to FIG. 1.

The method 300 also includes extracting, at the device, a set of parameters from the audio signal, at 304. For example, the parameter generator 122 of FIG. 1 may extract the set of parameters 107 from the output signal 115, as described with reference to FIG. 1.

The method 300 further includes performing, at the device, liveness verification by determining, based on a first plurality of parameters and a liveness data model, whether the audio signal corresponds to a first audio type indicating spoken speech or a second audio type indicating playback of recorded speech, at 306. For example, the liveness verifier 128 of FIG. 1 may perform liveness verification by determining, based on the first plurality of parameters 141 and the liveness data model 129, whether the output signal 115 corresponds to the first audio type 121 indicating spoken speech or the second audio type 123 indicating playback of recorded speech, as described with reference to FIG. 1.

The method 300 also includes performing, at the device, user verification by determining, based on a second plurality of parameters and a user speech model, whether the audio signal corresponds to speech of a particular user associated with the user speech model, at 308. For example, the user speech verifier 124 of FIG. 1 may perform user verification by determining, based on the second plurality of parameters 143 and the user speech model 125, whether the output signal 115 corresponds to speech of the authorized user 101 associated with the user speech model 125, as described with reference to FIG. 1.

The method 300 further includes performing, at the device, keyword verification by determining, based on a third plurality of parameters and a keyword data model, whether the audio signal corresponds to a particular keyword, at 310. For example, the keyword verifier 126 of FIG. 1 may perform keyword verification by determining, based on the third plurality of parameters 145 and the keyword data model 127, whether the output signal 115 corresponds to the authorized keyword 103, as described with reference to FIG. 1. The set of parameters 107 may include the first plurality of parameters 141, the second plurality of parameters 143, the third plurality of parameters 145, or a combination thereof.

The method 300 also includes generating, at the device, an output indicating that user authentication is successful based on determining that the audio signal corresponds to the speech of the particular user, to the particular keyword, and to the first audio type, at 312. For example, the user authenticator 130 of FIG. 1 may generate the user authentication output 113 indicating that user authentication is successful based on determining that the output signal 115 corresponds to the speech of the authorized user 101, to the authorized keyword 103, and to the first audio type 121, as described with reference to FIG. 1.

The method 300 thus enables user authentication that prevents false authentication based on spoofing by detecting whether the output signal 115 corresponds to the first audio type 121 indicative of spoken speech or to the second audio type 123 indicative of playback of recorded speech, whether the output signal 115 corresponds to the authorized user 101, whether the output signal 115 corresponds to the authorized keyword 103, or a combination thereof.

Figure 4:
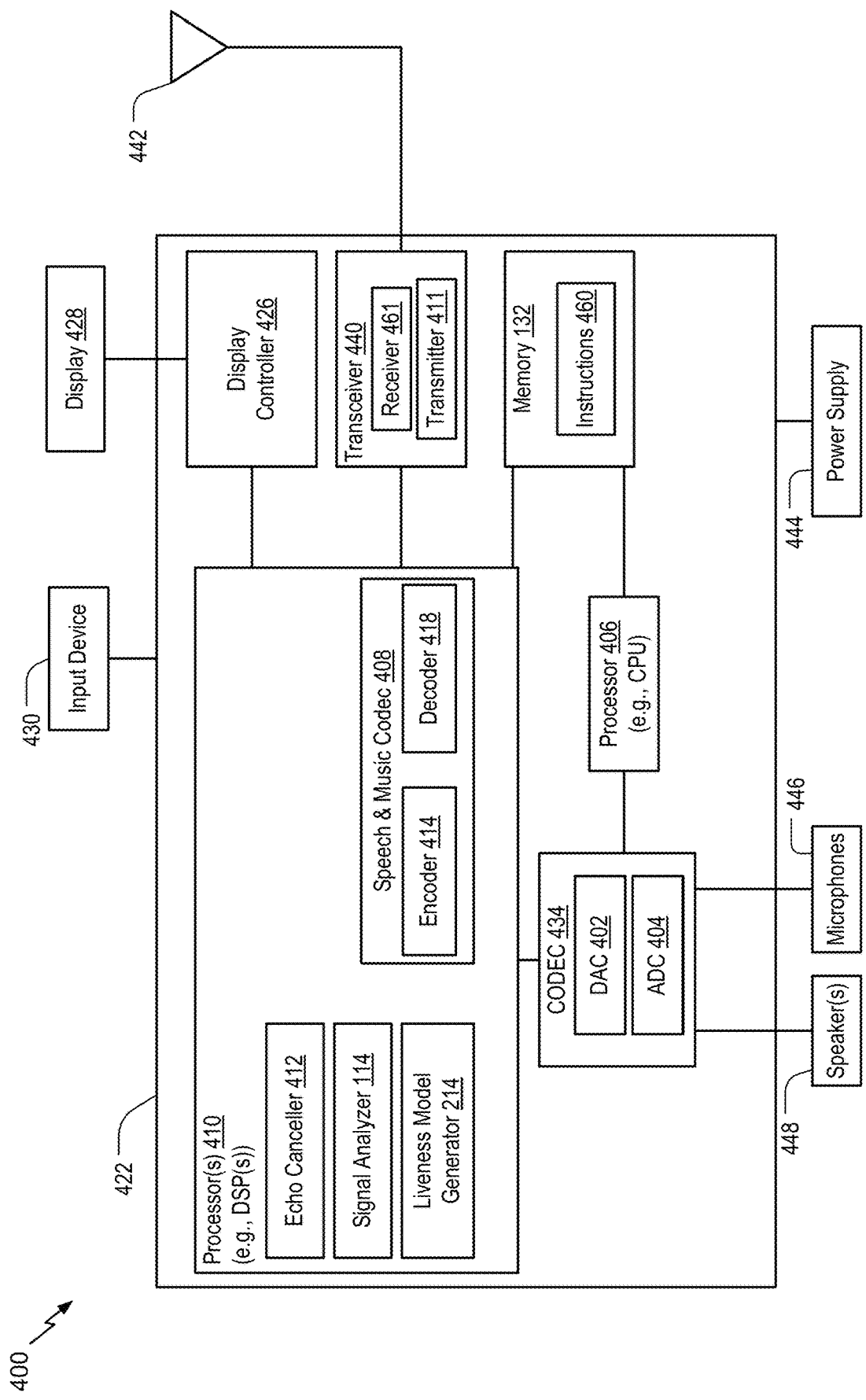
FIG. 4 is a block diagram of a device operable to perform user authentication in accordance with the systems and methods of FIGS. 1-3.

Referring to FIG. 4, a block diagram of a particular illustrative example of a device (e.g., a wireless communication device) is depicted and generally designated 400. In various aspects, the device 400 may have fewer or more components than illustrated in FIG. 4. In an illustrative aspect, the device 400 may correspond to the first device 104, the third device(s) 150 of FIG. 1, the device 204 of FIG. 2, or a combination thereof. In an illustrative aspect, the device 400 may perform one or more operations described with reference to systems and methods of FIGS. 1-3.

In a particular aspect, the device 400 includes a processor 406 (e.g., a central processing unit (CPU)). The device 400 may include one or more additional processors 410 (e.g., one or more digital signal processors (DSPs)). The processors 410 may include a media (e.g., speech and music) coder-decoder (CODEC) 408, and an echo canceller 412. The media CODEC 408 may include a decoder 418, an encoder 414, or both. The processors 410 may include the signal analyzer 114, the liveness model generator 214, or both. In a particular aspect, the media codec 408 includes the signal analyzer 114, the liveness model generator 214, or both.

The device 400 includes the memory 132 and a CODEC 434. The CODEC 434 may include a digital-to-analog converter (DAC) 402 and an analog-to-digital converter (ADC) 404. Although the media CODEC 408, the liveness model generator 214, and the signal analyzer 114 are illustrated as components of the processors 410 (e.g., dedicated circuitry and/or executable programming code), in other aspects one or more components of the media CODEC 408, the liveness model generator 214, the signal analyzer 114, or a combination thereof, such as the decoder 418, the encoder 414, or both, may be included in the processor 406, the CODEC 434, another processing component, or a combination thereof. In a particular aspect, the processors 410, the processor 406, the CODEC 434, or another processing component performs one or more operations described herein as performed by the signal analyzer 114, the liveness model generator 214, or both. In a particular aspect, operations described herein as performed by the signal analyzer 114 are performed by one or more processors included in the signal analyzer 114. In a particular aspect, operations described herein as performed by the liveness model generator 214 are performed by one or more processors included in the liveness model generator 214.

The device 400 may include a transceiver 440 coupled to an antenna 442. The transceiver 440 may include a transmitter 411, a receiver 461, or both. The device 400 may include a display 428 coupled to a display controller 426. The display 428 may include the display 148 of FIG. 1, the display 248 of FIG. 2, or both. One or more speakers 448 may be coupled to the CODEC 434. The speakers 448 may include the speaker(s) 244 of FIG. 2. One or more microphones 446 may be coupled to the CODEC 434. The microphones 446 may include the microphone 146 of FIG. 1, the microphone 246 of FIG. 2, or both.

The memory 132 may include instructions 460 executable by the processor 406, the processors 410, the CODEC 434, another processing unit of the device 400, or a combination thereof, to perform one or more operations described with reference to FIGS. 1-3.

One or more components of the device 400 may be implemented via dedicated hardware (e.g., circuitry), by a processor executing instructions to perform one or more tasks, or a combination thereof. As an example, the memory 132 or one or more components of the processor 406, the processors 410, and/or the CODEC 434 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 460) that, when executed by a computer (e.g., a processor in the CODEC 434, the processor 406, and/or the processors 410), may cause the computer to perform one or more operations described with reference to FIGS. 1-3. As an example, the memory 132 or the one or more components of the processor 406, the processors 410, and/or the CODEC 434 may be a non-transitory computer-readable medium that includes instructions (e.g., the instructions 460) that, when executed by a computer (e.g., a processor in the CODEC 434, the processor 406, and/or the processors 410), cause the computer perform one or more operations described with reference to FIGS. 1-3.

In a particular aspect, the device 400 may be included in a system-in-package or system-on-chip device (e.g., a mobile station modem (MSM)) 422. In a particular aspect, the processor 406, the processors 410, the display controller 426, the memory 132, the CODEC 434, and the transceiver 440 are included in a system-in-package or the system-on-chip device 422. In a particular aspect, an input device 430, such as a touchscreen and/or keypad, and a power supply 444 are coupled to the system-on-chip device 422. Moreover, in a particular aspect, as illustrated in FIG. 4, the display 428, the input device 430, the speakers 448, the microphones 446, the antenna 442, and the power supply 444 are external to the system-on-chip device 422. However, each of the display 428, the input device 430, the speakers 448, the microphones 446, the antenna 442, and the power supply 444 can be coupled to a component of the system-on-chip device 422, such as an interface or a controller. The device 400 may include a wireless telephone, a mobile device, a mobile communication device, a mobile phone, a smart phone, a cellular phone, a wireless phone, a laptop computer, a desktop computer, a computer, a tablet computer, a set top box, a personal digital assistant (PDA), a display device, a television, a game console, a music player, a radio, a video player, an entertainment unit, a communication device, a fixed location data unit, a personal media player, a digital video player, a digital video disc (DVD) player, a tuner, a camera, a navigation device, a decoder system, an encoder system, or any combination thereof.

In conjunction with the described implementations, an apparatus includes means for generating an output signal responsive to receiving an audio signal. For example, the means for generating the output signal may include the microphone 146, the first device 104, the third device(s) 150, the system 100 of FIG. 1, the microphones 446, the device 400, one or more devices configured to generate an output signal responsive to receiving an audio signal, or a combination thereof.

The apparatus also includes means for extracting a set of parameters from the output signal. For example, the means for extracting may include the parameter generator 122, the signal analyzer 114, the first device 104, the third device(s) 150, the system 100 of FIG. 1, the processors 410, the processor 406, the CODEC 434, the device 400, one or more devices configured to extract a set of parameters from the output signal (e.g., a processor executing instructions that are stored at a computer-readable storage device), or a combination thereof.

The apparatus further includes means for performing liveness verification by determining, based on a first plurality of parameters and a liveness data model, whether the audio signal corresponds to a first audio type indicating spoken speech or a second audio type indicating playback of recorded speech. For example, the means for performing liveness verification may include the liveness verifier 128, the signal analyzer 114, the first device 104, the third device(s) 150, the processors 410, the processor 406, the CODEC 434, the device 400, one or more devices configured to perform liveness verification by determining, based on a first plurality of parameters and a liveness data model, whether an audio signal corresponds to the first audio type or the second audio type (e.g., a processor executing instructions that are stored at a computer-readable storage device), or a combination thereof.

The apparatus also includes means for performing user verification by determining, based on a second plurality of parameters and a user speech model, whether the audio signal corresponds to speech of a particular user associated with the user speech model. For example, the means for performing user verification may include the user speech verifier 124, the signal analyzer 114, the first device 104, the third device(s) 150, the processors 410, the processor 406, the CODEC 434, the device 400, one or more devices configured to perform user verification by determining, based on a second plurality of parameters and a user speech model, whether an audio signal corresponds to speech of a particular user associated with the user speech model (e.g., a processor executing instructions that are stored at a computer-readable storage device), or a combination thereof.

The apparatus further includes means for performing keyword verification by determining, based on a third plurality of parameters and a keyword data model, whether the audio signal corresponds to a particular keyword. For example, the means for performing keyword verification may include the keyword verifier 126, the signal analyzer 114, the first device 104, the third device(s) 150, the processors 410, the processor 406, the CODEC 434, the device 400, one or more devices configured to perform keyword verification by determining, based on a third plurality of parameters and a keyword data model, whether an audio signal corresponds to a particular keyword (e.g., a processor executing instructions that are stored at a computer-readable storage device), or a combination thereof. The set of parameters 107 may include the first plurality of parameters 141, the second plurality of parameters 143, and the third plurality of parameters 145, as described with reference to FIG. 1.

The apparatus also includes means for generating an output indicating that user authentication is successful in response to determining that the audio signal corresponds to the speech of the particular user, to the particular keyword, and to the first audio type. For example, the means for generating the output may include the user authenticator 130, the signal analyzer 114, the first device 104, the third device(s) 150, the processors 410, the processor 406, the CODEC 434, the device 400, one or more devices configured to generate an output indicating that user authentication is successful in response to determining that the audio signal corresponds to speech of the particular user, to the particular keyword, and to the first audio type (e.g., a processor executing instructions that are stored at a computer-readable storage device), or a combination thereof.

It should be noted that various functions performed by the one or more components of the systems and devices disclosed herein are described as being performed by certain components or modules. This division of components and modules is for illustration only. In an alternate implementation, a function performed by a particular component or module is divided amongst multiple components or modules. Moreover, in an alternate implementation, two or more components or modules are integrated into a single component or module. Each component or module may be implemented using hardware (e.g., a field-programmable gate array (FPGA) device, an application-specific integrated circuit (ASIC), a DSP, a controller, etc.), software (e.g., instructions executable by a processor), or any combination thereof.

Figure 5:
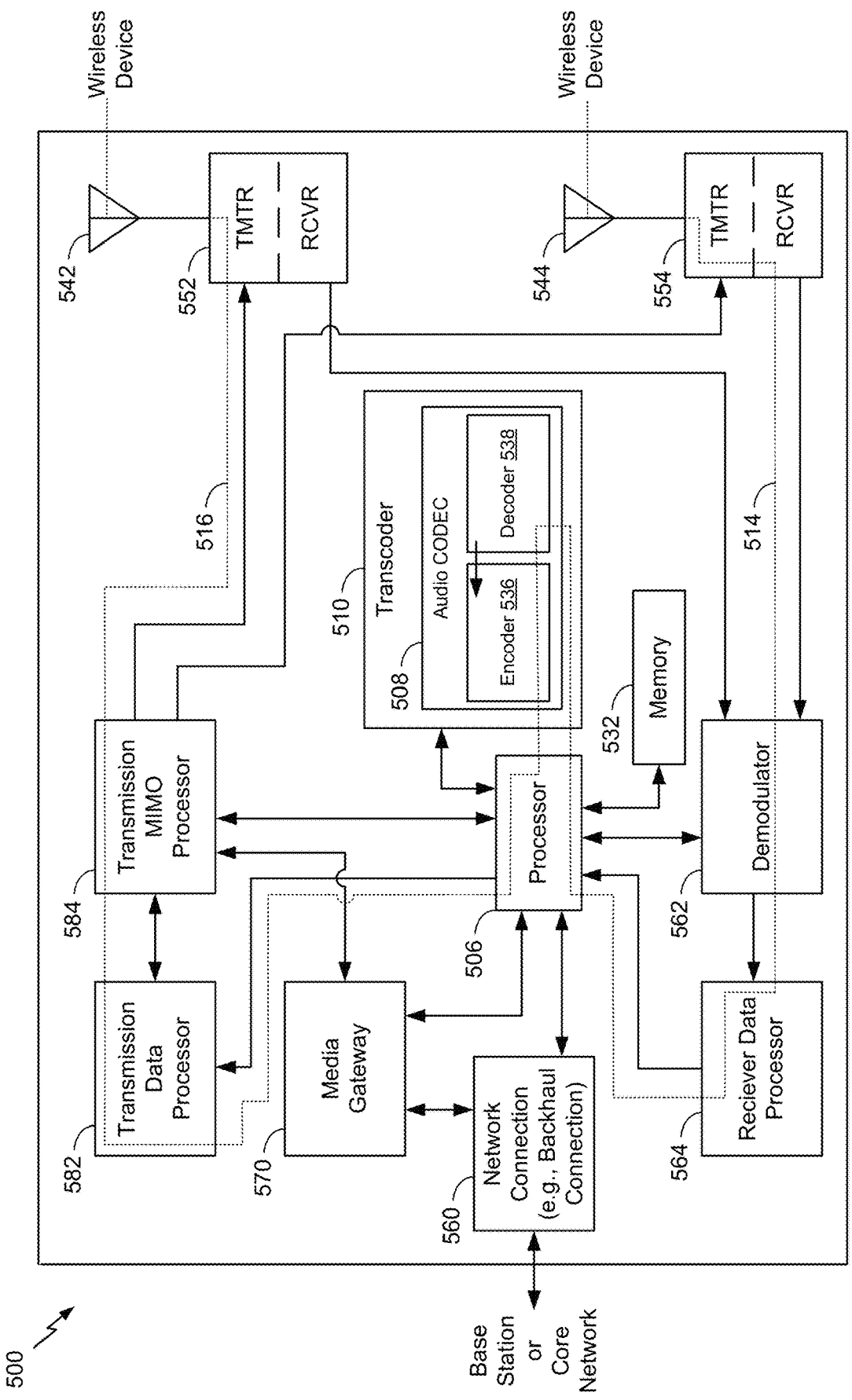
FIG. 5 is a block diagram of a base station operable to perform user authentication in accordance with the systems and methods of FIGS. 1-4.

Referring to FIG. 5, a block diagram of a particular illustrative example of a base station 500 is depicted. In various implementations, the base station 500 may have more components or fewer components than illustrated in FIG. 5. In an illustrative example, the base station 500 includes the first device 104, one of the third device(s) 150 of FIG. 1, or a combination thereof. In an illustrative example, the base station 500 performs one or more operations described with reference to FIGS. 1-4.

The base station 500 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 400 of FIG. 4.

Various functions may be performed by one or more components of the base station 500 (and/or in other components not shown), such as sending and receiving messages and data (e.g., audio data). In a particular example, the base station 500 includes a processor 506 (e.g., a CPU). The base station 500 may include a transcoder 510. The transcoder 510 may include an audio CODEC 508 (e.g., a media CODEC). For example, the transcoder 510 may include one or more components (e.g., circuitry) configured to perform operations of the audio CODEC 508. As another example, the transcoder 510 may be configured to execute one or more computer-readable instructions to perform the operations of the audio CODEC 508. Although the audio CODEC 508 is illustrated as a component of the transcoder 510, in other examples one or more components of the audio CODEC 508 may be included in the processor 506, another processing component, or a combination thereof. For example, a decoder 538 (e.g., a vocoder decoder) may be included in a receiver data processor 564. As another example, an encoder 536 (e.g., a vocoder encoder) may be included in a transmission data processor 582.

The transcoder 510 may function to transcode messages and data between two or more networks. The transcoder 510 may be configured to convert message and audio data from a first format (e.g., a digital format) to a second format. To illustrate, the decoder 538 may decode encoded signals having a first format and the encoder 536 may encode the decoded signals into encoded signals having a second format. Additionally or alternatively, the transcoder 510 may be configured to perform data rate adaptation. For example, the transcoder 510 may downconvert a data rate or upconvert the data rate without changing a format the audio data. To illustrate, the transcoder 510 may downconvert 64 kbit/s signals into 16 kbit/s signals.

The audio CODEC 508 may include the encoder 536 and the decoder 538. The audio CODEC 508 may include the parameter generator 122, the liveness verifier 128, the user speech verifier 124, the keyword verifier 126, the user authenticator 130, the signal analyzer 114 of FIG. 1, the liveness model generator 214 of FIG. 2, or a combination thereof.

The base station 500 may include a memory 532. The memory 532, such as a computer-readable storage device, may include instructions. The instructions may include one or more instructions that are executable by the processor 506, the transcoder 510, or a combination thereof, to perform one or more operations described with reference to FIGS. 1-4. The base station 500 may include multiple transmitters and receivers (e.g., transceivers), such as a first transceiver 552 and a second transceiver 554, coupled to an array of antennas. The array of antennas may include a first antenna 542 and a second antenna 544. The array of antennas may be configured to wirelessly communicate with one or more wireless devices, such as the device 400 of FIG. 4. For example, the second antenna 544 may receive a data stream 514 (e.g., a bit stream) from a wireless device. The data stream 514 may include messages, data (e.g., encoded speech data), or a combination thereof.

The base station 500 may include a network connection 560, such as backhaul connection. The network connection 560 may be configured to communicate with a core network or one or more base stations of the wireless communication network. For example, the base station 500 may receive a second data stream (e.g., messages or audio data) from a core network via the network connection 560. The base station 500 may process the second data stream to generate messages or audio data and provide the messages or the audio data to one or more wireless device via one or more antennas of the array of antennas or to another base station via the network connection 560. In a particular implementation, the network connection 560 may be a wide area network (WAN) connection, as an illustrative, non-limiting example. In some implementations, the core network may include or correspond to a Public Switched Telephone Network (PSTN), a packet backbone network, or both.

The base station 500 may include a media gateway 570 that is coupled to the network connection 560 and the processor 506. The media gateway 570 may be configured to convert between media streams of different telecommunications technologies. For example, the media gateway 570 may convert between different transmission protocols, different coding schemes, or both. To illustrate, the media gateway 570 may convert from PCM signals to Real-Time Transport Protocol (RTP) signals, as an illustrative, non-limiting example. The media gateway 570 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 570 may include a transcoder, such as the transcoder 510, and may be configured to transcode data when codecs are incompatible. For example, the media gateway 570 may transcode between an Adaptive Multi-Rate (AMR) codec and a G.711 codec, as an illustrative, non-limiting example. The media gateway 570 may include a router and a plurality of physical interfaces. In some implementations, the media gateway 570 may also include a controller (not shown). In a particular implementation, the media gateway controller may be external to the media gateway 570, external to the base station 500, or both. The media gateway controller may control and coordinate operations of multiple media gateways. The media gateway 570 may receive control signals from the media gateway controller and may function to bridge between different transmission technologies and may add service to end-user capabilities and connections.

The base station 500 may include a demodulator 562 that is coupled to the transceivers 552, 554, the receiver data processor 564, and the processor 506, and the receiver data processor 564 may be coupled to the processor 506. The demodulator 562 may be configured to demodulate modulated signals received from the transceivers 552, 554 and to provide demodulated data to the receiver data processor 564. The receiver data processor 564 may be configured to extract a message or audio data from the demodulated data and send the message or the audio data to the processor 506.

The base station 500 may include a transmission data processor 582 and a transmission multiple input-multiple output (MIMO) processor 584. The transmission data processor 582 may be coupled to the processor 506 and the transmission MIMO processor 584. The transmission MIMO processor 584 may be coupled to the transceivers 552, 554 and the processor 506. In some implementations, the transmission MIMO processor 584 may be coupled to the media gateway 570. The transmission data processor 582 may be configured to receive the messages or the audio data from the processor 506 and to code the messages or the audio data based on a coding scheme, such as CDMA or orthogonal frequency-division multiplexing (OFDM), as an illustrative, non-limiting examples. The transmission data processor 582 may provide the coded data to the transmission MIMO processor 584.

The coded data may be multiplexed with other data, such as pilot data, using CDMA or OFDM techniques to generate multiplexed data. The multiplexed data may then be modulated (i.e., symbol mapped) by the transmission data processor 582 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by the processor 506.

The transmission MIMO processor 584 may be configured to receive the modulation symbols from the transmission data processor 582 and may further process the modulation symbols and may perform beamforming on the data. For example, the transmission MIMO processor 584 may apply beamforming weights to the modulation symbols. The beamforming weights may correspond to one or more antennas of the array of antennas from which the modulation symbols are transmitted.

During operation, the second antenna 544 of the base station 500 may receive a data stream 514. The second transceiver 554 may receive the data stream 514 from the second antenna 544 and may provide the data stream 514 to the demodulator 562. The demodulator 562 may demodulate modulated signals of the data stream 514 and provide demodulated data to the receiver data processor 564. The receiver data processor 564 may extract audio data from the demodulated data and provide the extracted audio data to the processor 506.

The processor 506 may provide the audio data to the transcoder 510 for transcoding. The decoder 538 of the transcoder 510 may decode the audio data from a first format into decoded audio data and the encoder 536 may encode the decoded audio data into a second format. In some implementations, the encoder 536 may encode the audio data using a higher data rate (e.g., upconvert) or a lower data rate (e.g., downconvert) than received from the wireless device. In other implementations the audio data may not be transcoded. Although transcoding (e.g., decoding and encoding) is illustrated as being performed by a transcoder 510, the transcoding operations (e.g., decoding and encoding) may be performed by multiple components of the base station 500. For example, decoding may be performed by the receiver data processor 564 and encoding may be performed by the transmission data processor 582. In other implementations, the processor 506 may provide the audio data to the media gateway 570 for conversion to another transmission protocol, coding scheme, or both. The media gateway 570 may provide the converted data to another base station or core network via the network connection 560.

The decoder 538 and the encoder 536 may select a corresponding decoder (e.g., a speech decoder or a non-speech decoder) and a corresponding encoder to transcode (e.g., decode and encode) the frame. The decoder 538 and the encoder 536 may determine, on a frame-by-frame basis, whether each received frame of the data stream 514 corresponds to a narrowband frame or a wideband frame and may select a corresponding decoding output mode (e.g., a narrowband output mode or a wideband output mode) and a corresponding encoding output mode to transcode (e.g., decode and encode) the frame. Encoded audio data generated at the encoder 536, such as transcoded data, may be provided to the transmission data processor 582 or the network connection 560 via the processor 506.

The transcoded audio data from the transcoder 510 may be provided to the transmission data processor 582 for coding according to a modulation scheme, such as OFDM, to generate the modulation symbols. The transmission data processor 582 may provide the modulation symbols to the transmission MIMO processor 584 for further processing and beamforming. The transmission MIMO processor 584 may apply beamforming weights and may provide the modulation symbols to one or more antennas of the array of antennas, such as the first antenna 542 via the first transceiver 552. Thus, the base station 500 may provide a transcoded data stream 516, that corresponds to the data stream 514 received from the wireless device, to another wireless device. The transcoded data stream 516 may have a different encoding format, data rate, or both, than the data stream 514. In other implementations, the transcoded data stream 516 may be provided to the network connection 560 for transmission to another base station or a core network.

In the transcoder 510, the parameter generator 122 may extract the set of parameters 107. The liveness verifier 128 may generate the liveness verification output 119. The user speech verifier 124 may generate the user verification output 109. The keyword verifier 126 may generate the keyword verification output 111. The user authenticator 130 may generate the user authentication output 113. The base station 500 may transmit the set of parameters 107, the liveness verification output 119, the user verification output 109, the keyword verification output 111, the user authentication output 113, or a combination thereof, along with the output signal 115 to the first device 104 for display at the display 148.

The base station 500 may therefore include a computer-readable storage device (e.g., the memory 532) storing instructions that, when executed by a processor (e.g., the processor 506 or the transcoder 510), cause the processor to perform operations including extracting a set of parameters from an audio signal. The operations also include performing liveness verification by determining, based on a first plurality of parameters and a liveness data model, whether the audio signal corresponds to a first audio type indicating spoken speech or a second audio type indicating playback of recorded speech. The operations further include performing user verification by determining, based on a second plurality of parameters and a user speech model, whether the audio signal corresponds to speech of a particular user associated with the user speech model. The operations also include performing keyword verification by determining, based on a third plurality of parameters and a keyword data model, whether the audio signal corresponds to a particular keyword. The set of parameters includes the first plurality of parameters, the second plurality of parameters, and the third plurality of parameters. The operations further include generating an output indicating that user authentication is successful in response to determining that the audio signal corresponds to the speech of the particular user, to the particular keyword, and to the first audio type.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
    a processor configured to:
        extract a set of parameters from an audio signal;
        perform liveness verification by determining, based on a first plurality of parameters and a liveness data model, whether the audio signal corresponds to a first audio type indicating spoken speech or a second audio type indicating playback of recorded speech;
        perform user verification by determining, based on a second plurality of parameters and a user speech model, whether the audio signal corresponds to speech of a particular user associated with the user speech model and that the audio signal corresponds to the first audio type, and refrain from performing the user verification based on determining that the audio signal corresponds to the second audio type;
        perform keyword verification by determining, based on a third plurality of parameters and a keyword data model, whether the audio signal corresponds to a particular keyword, wherein the set of parameters includes the first plurality of parameters, the second plurality of parameters, and the third plurality of parameters; and
        generate an output indicating that user authentication is successful in response to determining that the audio signal corresponds to the speech of the particular user, to the particular keyword, and to the first audio type.

2. The device of claim 1, wherein the processor is further configured to generate a second output indicating that the user authentication failed in response to determining that the audio signal corresponds to the second audio type.

3. The device of claim 2, wherein the processor is configured to generate the second output independently of performing the keyword verification and the user verification.

4. The device of claim 1, wherein the liveness data model is user-independent.

5. The device of claim 1, wherein the first plurality of parameters is the same as the second plurality of parameters, and wherein the second plurality of parameters is the same as the third plurality of parameters.

6. The device of claim 1, wherein the liveness data model is trained based on a first set of recordings corresponding to spoken speech and a second set of recordings corresponding to played-back speech.

7. The device of claim 6, wherein the processor is configured to determine that the audio signal corresponds to the first audio type based on determining that the liveness data model indicates that the first plurality of parameters corresponds more closely to a second plurality of parameters of the first set of recordings than to a third plurality of parameters of the second set of recordings.

8. The device of claim 1, wherein the liveness data model includes a machine-learning data model, and wherein the processor is configured to train the liveness data model by:
   extracting a first set of parameters from a first recording corresponding to spoken speech;
   extracting a second set of parameters from a second recording corresponding to playback of the first recording;
   updating the liveness data model based on the first set of parameters corresponding to the first audio type; and
   updating the liveness data model based on the second set of parameters corresponding to the second audio type.

9. The device of claim 1, wherein the first plurality of parameters indicates characteristics of the audio signal.

10. The device of claim 9, wherein the characteristics include a dynamic frequency range of the audio signal.

11. The device of claim 1, further comprising a display, wherein the processor is further configured to:
   receive user input indicating that the user authentication is to be performed;
   generate the particular keyword in response to receiving the user input; and
   provide a graphical user interface (GUI) indicating the particular keyword to the display, wherein the microphone is configured to receive the audio signal subsequent to the processor providing the GUI to the display.

12. The device of claim 1, further comprising:
   a microphone configured to generate the audio signal responsive to receiving an input audio signal;
   an antenna; and
   a transmitter coupled to the antenna and configured to transmit, via the antenna, authentication data to a second device based on determining that the user authentication is successful.

13. The device of claim 12, wherein the microphone, the processor, the antenna, and the transmitter are integrated into a mobile device.

14. A method comprising:
   receiving an audio signal at a device;
   extracting, at the device, a set of parameters from the audio signal;
   performing, at the device, liveness verification by determining, based on a first plurality of parameters and a liveness data model, whether the audio signal corresponds to a first audio type indicating spoken speech or a second audio type indicating playback of recorded speech;
   performing, at the device, user verification by determining, based on a second plurality of parameters and a user speech model, whether the audio signal corresponds to speech of a particular user associated with the user speech model, wherein the user speech model is distinct from the liveness data model;
   performing, at the device, keyword verification by determining, based on a third plurality of parameters and a keyword data model, whether the audio signal corresponds to a particular keyword, wherein the set of parameters includes the first plurality of parameters, the second plurality of parameters, and the third plurality of parameters; and
   generating, at the device, an output indicating that user authentication is successful based on determining that the audio signal corresponds to the speech of the particular user, to the particular keyword, and to the first audio type.

15. The method of claim 14, wherein the liveness data model is trained based on a first set of recordings corresponding to spoken speech and a second set of recordings corresponding to played-back speech.

16. The method of claim 15, wherein the first plurality of parameters indicates a dynamic frequency range of the audio signal, wherein the audio signal is determined to correspond to the first audio type based on determining that that the liveness data model indicates that the dynamic frequency range of the audio signal corresponds more closely to first dynamic frequency ranges of the first set of recordings than to second dynamic frequency ranges of the second set of recordings.

17. The method of claim 14, wherein the user speech model is trained based on input audio signals associated with the particular user.

18. The method of claim 14, wherein the set of parameters is extracted in response to receiving a user input indicating that the user authentication is to be performed.

19. The method of claim 14, wherein the user verification is performed in response to determining that the audio signal corresponds to the first audio type.

20. A computer-readable storage device storing instructions that, when executed by a processor, cause the processor to perform operations comprising:
   extracting a set of parameters from an audio signal;
   performing liveness verification by determining, based on a first plurality of parameters and a liveness data model, whether the audio signal corresponds to a first audio type indicating spoken speech or a second audio type indicating playback of recorded speech;
   performing user verification by determining, based on a second plurality of parameters and a user speech model, whether the audio signal corresponds to speech of a particular user associated with the user speech model;
   performing keyword verification by determining, based on a third plurality of parameters and a keyword data model, whether the audio signal corresponds to a particular keyword, wherein the set of parameters includes the first plurality of parameters, the second plurality of parameters, and the third plurality of parameters;

generating an output indicating that user authentication is successful in response to determining that the audio signal corresponds to the speech of the particular user, to the particular keyword, and to the first audio type; and updating the user speech model based on the set of parameters in response to determining that the user authentication is successful.

21. The computer-readable storage device of claim 20, wherein the liveness data model is trained based on a first set of recordings corresponding to spoken speech and a second set of recordings corresponding to played-back speech.

22. The computer-readable storage device of claim 20, wherein the user speech model is trained based on input audio signals associated with the particular user.

23. The computer-readable storage device of claim 20, wherein the first plurality of parameters is the same as the second plurality of parameters, and wherein the second plurality of parameters is the same as the third plurality of parameters.

24. The computer-readable storage device of claim 20, wherein the operations further comprise:
determining that the user authentication is to be performed in response to determining that the audio signal corresponds to the particular keyword; and
in response to determining that the user authentication is to be performed, performing the liveness verification and performing the user verification.

25. The computer-readable storage device of claim 20, wherein the user speech model is distinct from the liveness data model.

26. An apparatus comprising:
means for generating an output signal responsive to receiving an audio signal;
means for extracting a set of parameters from the output signal;
means for performing liveness verification by determining, based on a first plurality of parameters and a liveness data model, whether the audio signal corresponds to a first audio type indicating spoken speech or a second audio type indicating playback of recorded speech;
means for performing user verification by determining, based on a second plurality of parameters and a user speech model, whether the audio signal corresponds to speech of a particular user associated with the user speech model, wherein the user speech model is distinct from the liveness data model;
means for performing keyword verification by determining, based on a third plurality of parameters and a keyword data model, whether the audio signal corresponds to a particular keyword, wherein the set of parameters includes the first plurality of parameters, the second plurality of parameters, and the third plurality of parameters; and
means for generating an output indicating that user authentication is successful in response to determining that the audio signal corresponds to the speech of the particular user, to the particular keyword, and to the first audio type.

27. The apparatus of claim 26, wherein the means for generating the output signal, the means for extracting the set of parameters, the means for performing the liveness verification, the means for performing the user verification, the means for performing the keyword verification, and the means for generating the output are integrated into a communication device, a personal digital assistant (PDA), a computer, a music player, a video player, an entertainment unit, a navigation device, a mobile device, a fixed location data unit, or a set top box.

28. A device comprising:
a processor configured to:
extract a set of parameters from an audio signal;
perform liveness verification by determining, based on a first plurality of parameters and a liveness data model, whether the audio signal corresponds to a first audio type indicating spoken speech or a second audio type indicating playback of recorded speech;
perform user verification by determining, based on a second plurality of parameters and a user speech model, whether the audio signal corresponds to speech of a particular user associated with the user speech;
perform keyword verification by determining, based on a third plurality of parameters and a keyword data model, whether the audio signal corresponds to a particular keyword, wherein the set of parameters includes the first plurality of parameters, the second plurality of parameters, and the third plurality of parameters;
generate an output indicating that user authentication is successful in response to determining that the audio signal corresponds to the speech of the particular user, to the particular keyword, and to the first audio type; and
generate a second output indicating that the user authentication failed in response to determining that the audio signal corresponds to the second audio type, wherein the second output is generated independently of performing the keyword verification and the user verification.

29. A device comprising:
a processor configured to:
extract a set of parameters from an audio signal;
perform liveness verification by determining, based on a first plurality of parameters and a liveness data model, whether the audio signal corresponds to a first audio type indicating spoken speech or a second audio type indicating playback of recorded speech, wherein the liveness data model is user-independent;
perform user verification by determining, based on a second plurality of parameters and a user speech model, whether the audio signal corresponds to speech of a particular user associated with the user speech model;
perform keyword verification by determining, based on a third plurality of parameters and a keyword data model, whether the audio signal corresponds to a particular keyword, wherein the set of parameters includes the first plurality of parameters, the second plurality of parameters, and the third plurality of parameters; and
generate an output indicating that user authentication is successful in response to determining that the audio signal corresponds to the speech of the particular user, to the particular keyword, and to the first audio type.

* * * * *